Dec. 1, 1959 H. G. BOYLE 2,915,634
SIMPLIFIED ELECTRONIC COMMUTATOR
Filed May 29, 1957
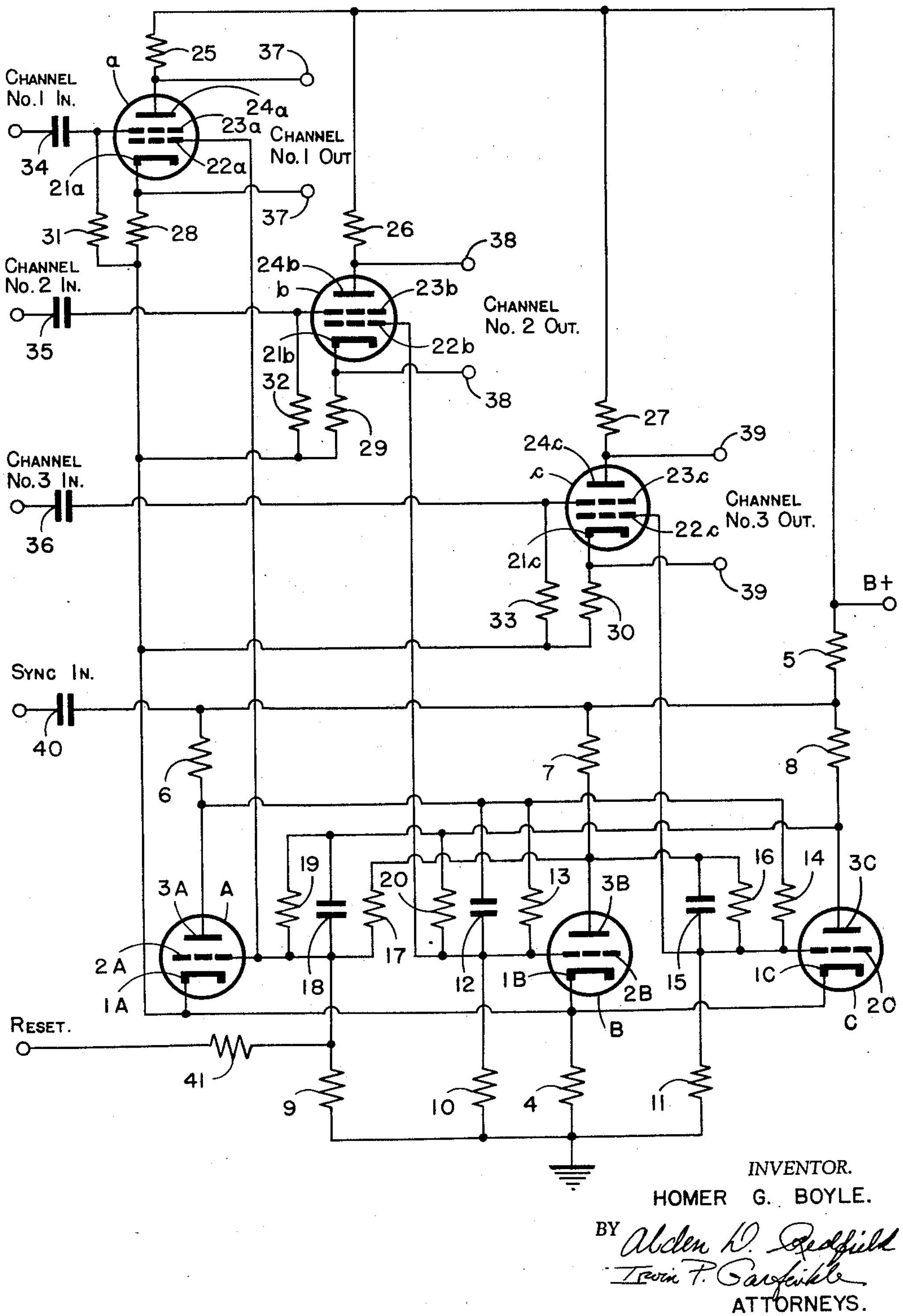
INVENTOR.
HOMER G. BOYLE.
BY Alden D. Redfield
Irwin P. Garfinkle
ATTORNEYS.

2,915,634

SIMPLIFIED ELECTRONIC COMMUTATOR

Homer G. Boyle, Dayton, Ohio, assignor to Avco Manufacturing Corporation, Cincinnati, Ohio, a corporation of Delaware Application May 29, 1957, Serial No. 662,353

1 Claim. (Cl. 250—27)

This invention relates to an electronic commutator and, more particularly, to an electronic commutator employing a tri-stable control device.

In telemetering, computing and other data transmission systems, it is often necessary to alternately or simultaneously measure or view the outputs of several separate channels. For example, in a telemetering system included in a high altitude research rocket, data such as radiation, temperature, friction, speed, distance, etc., etc., is continually transmitted from the rocket to an observation station. In many instances it is desirable that each of the transmitted conditions be measured and viewed on a single instrument, such as a cathode-ray oscilloscope. This has been accomplished by means of commutating systems which simultaneously or alternately permit the transmission of certain signals from the rocket for presentation on the receiver scope for predetermined intervals of time. In the past, commutation has been accomplished by mechanical switching or by means of conventional Eccles-Jordan triggers connected in ring circuits.

Analytical examination of the Eccles-Jordan circuit shows that, when used as a binary counter, it operates as a bi-stable device. In situations where it is desirable to have only one active circuit at a time, additional stages coupled to the inactive circuit will also be inactive if similar conditions of cutoff bias are used. Therefore, if the Eccles-Jordan circuit be extended to encompass three sections of circuitry comprising similar triodes, two of the three may be made inactive while the third conducts. In this way, a ternary counter having three stable conditions is produced, and the production of uneven numbers of stages is permitted.

By coupling gating circuits to each of the stages of the ternary counter, the gates can be made conductive or non-conductive in accordance with the biasing conditions of the associated ternary counter stage.

It is an object of this invention to provide a tri-stable switching network for commutating a multi-channel system.

Another object of this invention is to provide a tri-stable switching system employing electronic valves for controlling associated circuits.

For a more complete understanding of the objects and nature of this invention, reference should now be made to the following detailed description and to the accompanying drawing in which the single figure represents a preferred embodiment of my invention.

Briefly stated, the system includes a tri-stable switching network for controlling the operation of a multi-channel system. The tri-stable network may be similar to an Eccles-Jordan flip-flop circuit, but it includes an added stage connected in such a way that only one of the three stages is active at a given time. By applying a series of synchronizing pulses to the network, the active period of each stage and the firing of the succeeding stages is controlled. At least one gating tube is connected to each stage in the tristable network and, depending on the bias conditions of the network, the gates will be made active or inactive to control the operation of a channel. When additional independent channels are required, any number of bi-stable or tri-stable systems may be coupled with the described system, the last element of one stage controlling the firing of the first element in the next in a manner known in the prior art.

The tri-stable network comprises three triodes, A, B and C, each having a cathode 1A, 1B and 1C, a control grid 2A, 2B and 2C, and a plate 3A, 3B and 3C, respectively. Each of the triodes is self-biased to cutoff by means of a common cathode resistor 4 connected between the cathodes and ground. The plate of each triode is connected to the B+ supply resistor 5 through load resistors 6, 7 and 8, respectively. The triodes are each controlled by means of the potential applied to the respective grids through grid-biasing resistors 9, 10 or 11.

The three triodes A, B and C are intercoupled by means of a network connected between the plate of each triode and the grids of the other two triodes. This is, the plate 3A of triode A is coupled to biasing resistor 10 of the grid 2B by means of a parallel-connected condenser 12 and a resistor 13, and is also coupled to the biasing resistor 11 of the grid 2C by means of a resistor 14. The plate 3B of triode B is coupled to the grid-biasing resistor 11 by means of a parallel-connected condenser 15 and resistor 16, and to the biasing resistor 9 of grid 2A by means of a resistor 17. Similarly, the plate 3C of triode C is coupled to the grid-biasing resistor 9 of grid 2A by means of a parallel-connected condenser 18 and resistor 19, and to the grid-biasing resistor 10 of grid 2B by means of a resistor 20.

The network is arranged so that, in operation, one triode will conduct for a predetermined interval while the two remaining triodes are rendered nonconductive. Thereafter, a succeeding triode will be rendered conductive and the other two non-conductive, and so on.

Three gating circuits comprising dual grid tubes *a*, *b* and *c* are controlled by the triodes A, B and C, respectively. Each dual grid tube comprises a cathode 21, a first control grid 22, a second control grid 23 and a plate 24, the respective elements of each tube being designated by the characters *a*, *b* and *c*. Each of the plates 24*a*, 24*b* and 24*c* is connected to the B+ supply through load resistors 25, 26 and 27, respectively, and the cathodes 21*a*, 21*b* and 21*c* are each coupled by means of resistors 28, 29 and 30 to the cathodes of triodes A, B and C, respectively. The first control grids 22*a*, 22*b* and 22*c* are directly coupled to the grids 2A, 2B and 2C of the triodes A, B and C, and the same signals which control grids 2A, 2B and 2C also control the grids 22. The second control grids 23*a*, 23*b* and 23*c* are biased by means of resistors 31, 32 and 33, respectively, and input signals to each of the tubes *a*, *b* and *c* are coupled to the second control grids 23 by means of condensers 34, 35 and 36, as indicated.

In the arrangement shown, the dual grid tubes *a*, *b* and *c* function as gates for three separate channels having inputs through the condensers 34, 35 and 36 and having outputs at the terminals 37, 38 and 39, respectively. If the bias on each of the first control grids 22*a*, 22*b* and 22*c* is such that the tubes *a*, *b* and *c* are cut off, then an input signal does not appear in the output. However, if any of the three tubes are made conductive, the input signals applied to the second control grids 23*a*, 23*b* and 23*c* will appear in the outputs. Since the biasing network for the grid 2A of triode A is connected in parallel with the biasing network for the grid 22*a*, the tube *a* will be rendered conductive at the same time as the triode A, and any signal applied to the second control grid 23*a* through the condenser 34 will appear at terminals 37. Similarly, when the triode B is conductive, the tube $b$ will also be conductive, and when the triode C is conductive, the tube $c$ will be conductive. The duration of operation of each gating circuit is controlled by means of a series of pulses applied to the sync input of the flip-flop circuit. The synchronizing signals may be positive or negative pulses applied to the plate circuits through a condenser 40 and the plate loads 6, 7 and 8. By means of a large positive or negative signal applied across the biasing resistor 9 through a resistor 41, the cycle of operation can be re-set to start at any given time.

The sequence of operation of the flip-flop network may be traced as follows: At the moment the B+ supply is connected, some current begins to flow through each of the triodes A, B and C. However, because of the inevitable unbalance of the triodes, one starts to conduct more rapidly than the other two. If it is assumed that the triode A is more conductive than triode B or triode C, it follows that the decreased voltage at the plate 3A will be coupled through the resistors 13 and 14 to the grid-biasing resistors 10 and 11, thereby rendering the triodes B and C progressively less conductive. The resulting increased voltages at the plates 3B and 3C are coupled through the resistors 17 and 19 and the condenser 18 to the grid-biasing resistor 9 of grid 2A, thereby rendering the triode A progressively more conductive. This action continues until the triodes B and C are cut off as a result of the decreased voltage applied from the plate 3A and as a result of the negative grid-biasing voltage produced from the self-biasing resistor 4. Thus, the triode A is conducting alone to establish a first stable condition.

While the triode A is conducting, the dual grid tube $a$ is rendered conductive, and signals applied at the input to channel No. 1 will appear in the output. Conduction of the triode A is continued until a negative sync pulse is applied to the plate of each of the triodes through the condenser 40 and the resistors 6, 7 and 8. The negative pulse does not affect the triodes B and C, which are cut off, but a momentary decrease in conduction is produced in triode A. This causes an increase in voltage at the plate 3A which is directly coupled through the condenser 12 to the grid 2B of the triode B, thereby causing some conduction of the triode B and a corresponding decrease in voltage at the plate 3B. Since the plate 3B is coupled to the grid 2A through resistor 17, the triode A becomes progressively less conductive until it is cut off. The tube $c$ will be maintained non-conductive, since the decrease in voltage of plate 3B is also coupled to the grid $2c$ of that triode. During the period that the triode B conducts, the tube $b$ will also be conductive, and signals applied to the input of channel 2 will appear at the output.

Similarly, another negative pulse applied to the plates through the condenser 40 will cut off the triode B and will render the triode C conductive. During the period of conduction of the triode C, the tube $c$ will also be conductive, and signals applied at the input of channel 3 will appear at the output.

The duration of operation of each channel can be controlled by varying the spacing of the negative sync pulses applied through the condenser 40 to the plates of the triodes A, B and C. Since the triodes A, B and C conduct sequentially, the dual grid tubes $a$, $b$ and $c$ will also conduct sequentially, and channels No. 1, No. 2 and No. 3 will be operative in that order. However, the cycle can be interrupted at any time and re-set at the beginning by applying a large positive pulse through the resistor 41 to the grid $2a$ of triode A. Of course, if it is desired to re-set the operation to start the cycle at any other channel, a positive pulse may be applied to the grid of either triode B or C.

While the operation has been described as a tri-stable network, it is clear that by proper design of the R-C networks in a manner well known in the art, the same arrangement can be made to operate as a free-running or unstable system. In that case the duration of conduction of each triode A, B and C would be dependent on the relative size of the condensers 18, 12 and 15 and the grid-biasing resistors 9, 10 and 11, respectively. While for many purposes a free-running system may be suitable, the operation and timing of the pulsed system, as described, is considerably more precise and is preferred.

The network described permits the production of uneven numbers of stages, such as 3, 9, 15, etc. If the tri-stable network be combined with a binary network, it is seen that there will be produced the intermediate odd number of stages, such as 5, 11, 17, etc. By appropriate combinations of a suitable number of triodes in combinations of two or three units, any number of stages may be built up, provided there is a common cathode circuit in which cutoff bias is developed. If dual triodes are used in the tri-stable network, only one and one-half tube envelopes are required per stage for the entire commutator. The output from the gating tubes can be taken in either polarity, depending on whether the plate or the cathode circuit is used for coupling. The circuit can be plate-synchronized in order to maintain exact timing and the entire series returned to initiate a new sequence by means of the re-set circuit.

Having thus described my invention, what I claim is:

An electronic commutator for controlling the operation of at least first, second and third channels comprising: first, second and third electronic valves for directly controlling the operation of said first, second and third channels, respectively, each of said electronic valves comprising a vacuum tube having an input circuit including a control electrode and a cathode, and an output circuit including a plate and said cathode; means normally biasing each of said first, second and third vacuum tubes below cutoff; means coupling an input signal between said control electrode and said cathode of each of said vacuum tubes; means deriving said signal from the output of each of said vacuum tubes between said plate and said cathode when said vacuum tubes are conductive; means rendering said vacuum tubes sequentially conductive for predetermined periods, said means comprising fourth, fifth and sixth electronic valves, each of said valves comprising a vacuum tube having a plate, a control grid and a cathode, a grid-biasing resistor for each of said control grids, a common resistor connected in circuit with all of said cathodes for self-biasing said valves; means for coupling the plate of said fourth valve to the grid-biasing resistor of said fifth valve by means of a parallel-connected resistor and condenser and to the grid-biasing resistor of said sixth valve by means of a resistor; means for coupling the plate of said fifth valve to the grid-biasing resistor of said sixth valve by means of a parallel-connected resistor and condenser and to the grid-biasing resistor of said fourth valve by means of a resistor; means for coupling the plate of said sixth valve to the grid-biasing resistor of said fourth valve by means of a parallel-connected resistor and condenser and to the grid-biasing resistor of said fifth valve by means of a resistor; a source of direct voltage potential connected across said valves; a source of pulses applied to the plates of each of said fourth, fifth and sixth valves, whereby said valves conduct sequentially; and means connecting the control electrode of said first, second and third valves to the control grid of said fourth, fifth and sixth valves, respectively, and the cathode of each of said first, second and third valves to the cathodes of said fourth, fifth and sixth valves, whereby said first, second and third valves will conduct sequentially for a period dependent upon the period of conduction of the fourth, fifth and sixth valves, respectively, and whereby said signal is derived from said output circuit of said first, second and third valves during said periods of conduction.

References Cited in the file of this patent

UNITED STATES PATENTS

| | | |
|---|---|---|
| 2,485,886 | Johnstone et al. | Oct. 25, 1949 |
| 2,503,662 | Flowers | Apr. 11, 1950 |
| 2,589,465 | Weiner | Mar. 18, 1952 |
| 2,591,677 | Cleeton | Apr. 3, 1952 |
| 2,593,452 | Hoeppner | Apr. 22, 1952 |
| 2,594,092 | Taylor | Apr. 22, 1952 |
| 2,636,985 | Weissman | Apr. 28, 1953 |
| 2,644,887 | Wolfe | July 7, 1953 |
| 2,662,175 | Staal | Dec. 8, 1953 |